Aug. 23, 1949.    R. GILLIS    2,479,924
METHOD OF MAKING ELECTRICAL CONDUCTOR CABLES
Filed April 25, 1944
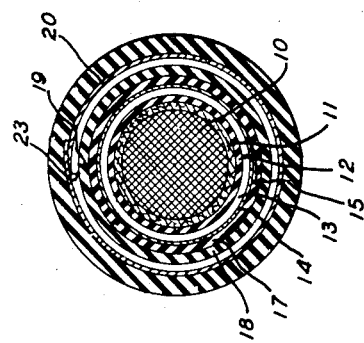
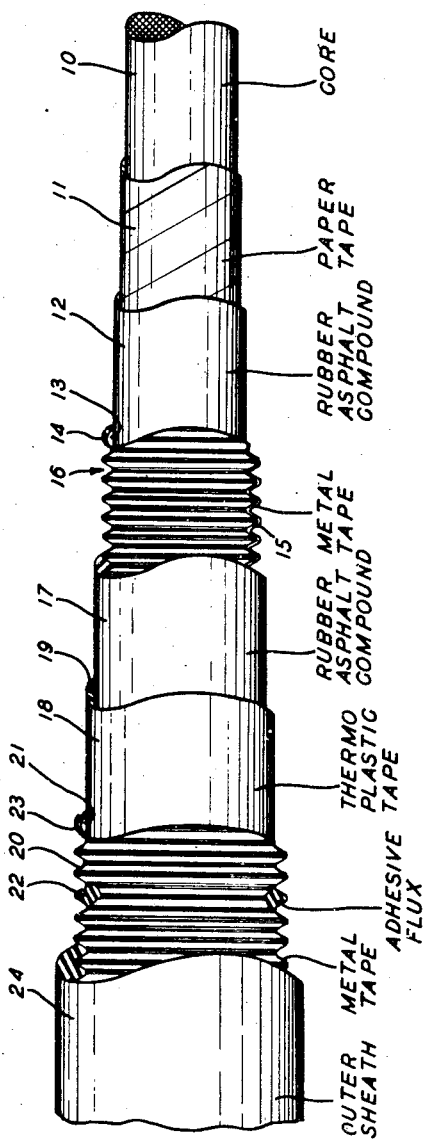
INVENTOR
R. GILLIS
BY
E. R. Nowlan
ATTORNEY Patented Aug. 23, 1949

2,479,924

UNITED STATES PATENT OFFICE 2,479,924

METHOD OF MAKING ELECTRICAL CONDUCTOR CABLES

Randall Gillis, Westfield, N. J., assignor to Western Electric Company, Incorporated, New York, N. Y., a corporation of New York Application April 25, 1944, Serial No. 532,614

2 Claims. (Cl. 154—2.25)

This invention relates to electrical conductor cables and a method of making the same, and more particularly to electrical conductor cables of relatively light weight yet provided with gastight and liquid-tight metallic sheathing, and to a method of making these.

Electrical conductor cables have long been made successfully and satisfactorily having sheaths continuously seamless both longitudinally and circumferentially of lead or one or another metallic alloy comprising lead as principal ingredient. Such sheaths are eminently satisfactory and suitable in every way except that they are necessarily both bulky and heavy. Owing to the relative softness and ductility of lead and of the lead alloys suitable for this purpose, cable sheaths of such material for mechanical strength in themselves and for mechanical protection to the cable cores which they enclosed, must be considerably thicker than is necessary to provide a merely gas-tight, moistureproof sheath.

An object of the present invention is to provide a cable structure which will enable the substitution for the seamlessly extruded but heavy lead material sheaths of metallic sheathings of copper, brass, iron or other metallic material not comprising any appreciable amount of lead which shall yet be substantially as flexible in use and as fully protective as lead sheaths while being materially less in weight.

With the above and other objects in view, the invention may be embodied in an electrical cable having a core, protective means for the core comprising a metal sheath having a longitudinal soldered seam therein and formed over the core, a substantially seamless layer of thermoplastic and impervious substance formed over the metal sheath, and a second metal sheath having a longitudinal soldered seam therein and formed over the layer, the seams of the two metal sheaths being spaced well apart circumferentially of the cable.

Other objects and features of the invention will appear from the following detailed description of an embodiment thereof taken in connection with the accompanying drawing, in which the same reference numerals are applied to identical parts in the several figures and in which Fig. 1 is a view in side elevation of a piece of electrical conductor cable constructed in accordance with the invention; and Fig. 2 is a transverse section of the same.

In the embodiment of the invention herein disclosed, the cable illustrated comprises a conductive core 10 of which no particular structure is shown or described since the specific structure of this is irrelevant to the invention proper which pertains to the sheathing of such a core. Over the core 10 is, preferably, a helical wrapping 11 of insulating material, e. g. paper, in tape form although this wrapping may be omitted in some instances. Over the wrapping 11 is a seamless layer of suitable insulating substance, e. g. an asphaltic material, a mineral wax composition, a composition comprising rubber, gutta percha, or the like, or other analogous sheathing stuff. Over the layer 12 is a metallic sheath 14. This is formed by folding a transversely corrugated, thin tape, of suitable metallic substance, about the previously described unitary structure, the axis of the tape as a whole being parallel to the axis of the core, and the edges of the tape being brought together, preferably overlapped as shown, and joined, e. g. by soldering or brazing, along a closure seam 15 running lengthwise of the sheath and substantially parallel to the axis of the whole. The material of the metal tape of which the sheath 14 is formed is preferably copper, brass, bronze, iron, aluminum or other similar metallic substance materially lighter and tougher than the lead materials often used. As shown here, the circumferential empty spaces or voids 13 formed between the layer 12 and the sheath 14 by the corrugations of the latter, are left unfilled. The corresponding valleys 16 on the outside of the sheath 14, however, are preferably filled, e. g., with rubber asphalt cement, or the like, to provide a smoothly cylindrical surface 17 upon which to form the next element 18 of the structure, which is a layer 18 of thermoplastic material.

This layer 18 is an important feature in the combination comprised in the invention. The material of it should be water repellant and water and vapor tight. It should remain soft and not subject to cracking when bent at low temperatures, say down to well below the temperature of freezing water, and should not soften and flow unduly when kept for longer periods at temperatures of the order of 150° F. On the other hand, it should be weldable when exposed for a brief interval to the heat occasioned by soldering or brazing the yet to be described metal sheath surrounding it as hereinafter related. Various compounds or compositions are known in the art which are suitable for this purpose, having the properties described. As an example, the composition made by compounding

| | Parts by weight |
|---|---|
| Reclaimed natural rubber | 40 |
| The hard hydrocarbon commercially known as mineral rubber | 12 |
| Clay | 43 |
| Cumar resin | 4 |
| Paraffin | 1 | is an eminently suitable composition for the layer 18. This can be formed into a solid, relatively tough and manageable tape at ordinary temperatures, which is applied longitudinally over the asphalt rubber cement filling 17 and folded into a tube with the edges of the tape abutted firmly together as a seam 19 running longitudinally along, substantially parallel to the whole structure.

Over the thermoplastic layer 18 is applied a second transversely corrugated metal tape sheath 20. The sheath 20 is substantially the same in form, material and structure as the sheath 14, but while being applied to and folded around the layer 18, the inside valleys 21 between the corrugations are preferably filled, as at 22, with a molten compound which is both an adhesive and a soldering flux. One suitable compound for this purpose and having the desired properties consists of Rosin_____per cent by weight__ 25 to 75
Rosin oil_____do____ 20 to 50
Polymerized isobutylene_____per cent__ 5 to 25

A suitable compound for the layers or coatings 12 and 17 may be made by softening the compound suggested above for the layer 18 with a mixture of asphalt, mineral oil and rosin oil until the desired consistency is obtained.

The corrugated metal tape to form the sheath 14, the thermoplastic tape to form the layer 18 and the corrugated metal tape to form the sheath 20 are applied in each case in such a way that the seam 15 of the sheath 14 and the seam 19 of the layer 18 are on opposite sides. The tape to form the sheath 20, however, is so applied that the overlap of its edges forming the seam 23 lies directly over and along the seam 19 of the layer 18. When the seam 23 is soldered in the manufacture of the cable, the heat of the soldering causes the edges of the tape in the layer 18 to weld together. Thus in the completed cable, the soldered seams 15 and 23 of the two metal sheaths 14 and 20 are on opposite sides of the cable as well as having the practically seamless layer 18 between them. If there should be or should develop flaws in the soldered seams 15 and 23 or in the welded seam 19, the imperviousness of the combination of the three elements 14, 18 and 20 will ordinarily be fully maintained, even if the filler 17 for the corrugation valleys 16 were omitted, since the chance of leaks appearing or developing in the three seams at points located in the same corrugation valley 16 is practically negligible and the corrugations between the valleys 16 and between the valleys 21 ordinarily prevent any leakage longitudinally of the cable even without the filling 17 and 22.

The simplest way to make the layer 18, in commercial manufacture, is that described above, by folding a tape about the core and welding its edges to close the seam 19, and such method of manufacture and the structure resulting therefrom will ordinarily be entirely satisfactory. However, where extreme assuredness of imperviousness is desired, e. g., where a cable is to serve under high external pressure of gas, vapor or liquid, the layer 18 may be created wholly seamlessly by extrusion.

As noted above, in the process of manufacture, the adhesive flux 22 is applied molten to the inner surface of the tape 20 while the latter is being formed around the layer 18. It is contemplated that the seam 23 will be soldered immediately the edges of the tape are overlapped and while the adhesive flux is still molten and provides no bar to the transfer of excess soldering heat therethrough to weld the seam 19.

Apparatus for carrying on the various steps of manufacture described form no part of the present invention, but such apparatus is variously described and claimed in copending applications Serial No. 532,613, now Patent No. 2,459,877, January 25, 1949, by the present inventor, and Serial No. 532,612, now abandoned, by the present inventor and another, filed of even date herewith, and to which reference may be had if desired.

It will be evident that so far as the cable itself and its embodiment of the invention are concerned, the nature of the structure enclosed within the sheath 14 is not material in any way provided that it contain one or more electrical strands. Hence in the appended claims the word "core" will be taken to mean any kind of electrical cable core to which the combination of the invention may be applicable. The completed structure as above described may be used in some instances without further added elements. Ordinarily, however, the metal sheath 20 will be covered with some further outer covering 24 whose nature and mode of application are irrelevant here.

Ordinarily the seam 15 and the seam 23 will be closed and sealed by soldering with one or another of the well known alloys, principally of lead and tin, used for such purpose. In some instances it may be desirable or necessary to close one or the other or both of these seams by brazing or welding. It is intended that the words "soldering," "soldered" and the like in the appended claims shall be taken to mean any suitable means of sealing these seams with molten metal.

What is claimed is:

1. The method of making an electrical conductor cable which comprises steps of forming a tape of metal into a sheath about a conductive cable core with the two edges of the tape forming a seam running longitudinally along the core, soldering the edges of the tape together to seal the seam formed thereby, forming a tape of thermoplastic substance about the soldered metal sheath into a layer enclosing the same and with the seam thereof spaced circumferentially of the core from the seam of the metal sheath, applying a second metal tape over the layer and covering the seam of the first metal sheath, forming the second metal tape into a sheath about the layer with the two edges of the tape forming a seam running longitudinally of the core and spaced circumferentially of the core from the seam of the first metal tape and lying directly on the seam of the tape of thermoplastic substance, and soldering the edges of the tape together to seal the seam formed thereby while also causing the edges of the tape of thermoplastic substance to be welded together by the heat of the soldering operation.

2. The method of making an electrical conductor cable which comprises steps of forming a tape of metal into a sheath about a conductive cable core with the two edges of the tape forming a seam running longitudinally along the core, soldering the edges of the tape together to seal the seam formed thereby, forming a tape of thermoplastic substance about the soldered metal sheath into a layer enclosing the same and with the seam thereof spaced circumferentially of the core from the seam of the metal sheath, applying a transversely corrugated second metal tape over the layer and covering the seam of the first metal sheath, filling the corrugations on the inner side of the second metal tape with adhesive flux material while applying the tape to the core, forming the second metal tape into a sheath about the layer with the two edges of the tape forming a seam running longitudinally of the core and spaced circumferentially of the core from the seam of the first metal tape and lying directly on the seam of the tape of thermoplastic substance, and soldering the edges of the tape together to seal the seam formed thereby while also causing the edges of the tape of thermoplastic substance to be welded together by the heat of the soldering operation.

RANDALL GILLIS.

REFERENCES CITED

The following references are of record in the file of this patent:

UNITED STATES PATENTS

| Number | Name | Date |
|---|---|---|
| 289,725 | Tainter | Dec. 4, 1883 |
| 1,233,807 | Read | July 17, 1917 |
| 1,514,292 | Knoderer | Nov. 4, 1924 |
| 2,088,446 | Specht | July 27, 1937 |
| 2,090,744 | Boe | Aug. 24, 1937 |
| 2,216,435 | Eckel | Oct. 1, 1940 |
| 2,319,744 | Mougey | May 18, 1943 |

FOREIGN PATENTS

| Number | Country | Date |
|---|---|---|
| 839,140 | France | Dec. 26, 1938 |